(12) United States Patent
Nagata et al.

(10) Patent No.: US 6,716,508 B2
(45) Date of Patent: Apr. 6, 2004

(54) OPTICAL RECORDING MEDIUM

(75) Inventors: Masayoshi Nagata, Kanagawa (JP); Motoyasu Yumita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/181,077

(22) PCT Filed: Nov. 1, 2001

(86) PCT No.: PCT/JP01/09603

§ 371 (c)(1),
(2), (4) Date: Jul. 12, 2002

(87) PCT Pub. No.: WO02/41305

PCT Pub. Date: May 23, 2002

(65) Prior Publication Data

US 2003/0003262 A1 Jan. 2, 2003

(30) Foreign Application Priority Data

Nov. 16, 2000 (JP) ........................................ 2000-349890

(51) Int. Cl.[7] ................................................ B32B 3/02
(52) U.S. Cl. .................... 428/64.1; 428/64.4; 369/275.3
(58) Field of Search ............................ 428/64.1, 64.4, 428/913; 430/270.11, 495.1, 945; 369/275.3, 279

(56) References Cited

U.S. PATENT DOCUMENTS

| | | | |
|---|---|---|---|
| 5,663,946 A | 9/1997 | Ohtomo | |
| 6,201,784 B1 * | 3/2001 | Maeda | 369/275.3 |
| 6,487,144 B2 * | 11/2002 | Nagata | 369/30.12 |
| 2002/0001278 A1 * | 1/2002 | Takemoto | 369/59.25 |
| 2002/0114228 A1 * | 8/2002 | Watanabe | 369/44.13 |

FOREIGN PATENT DOCUMENTS

| | | |
|---|---|---|
| EP | 0 727 774 | 8/1996 |
| JP | 6-44693 | 2/1994 |
| JP | 10-312545 | 11/1998 |
| JP | 2001-143319 | 5/2001 |
| WO | WO96/07179 | 3/1996 |

* cited by examiner

Primary Examiner—Elizabeth Mulvaney
(74) Attorney, Agent, or Firm—Frommer Lawrence & Haug LLP; William S. Frommer (57) ABSTRACT

In an optical recording medium of a recording format to record data on both lands and grooves in such a manner that a recording area is divided into a plurality of zones, and headers arranged continuously in radial directions in the same zone are not arranged in the same radial directions over a zone boundary, and the headers are so arranged as to be shared by the lands and the grooves, the headers arranged within three or more physical tracks from said zone boundary are cleared and grooved. Thereby, noise is prevented from occurring in a tracking error signal about the time from the occurrence of noise, which occurs in the tracking error signal and causes landing, until a tracking servo is performed, thus making it possible to enhance the stability of landing traversing a zone boundary.

2 Claims, 11 Drawing Sheets

| SM | VFO1 | AM | ID1 | VFO2 | AM | ID2 | PA2 |
|----|------|----|----|------|----|----|----|
| 8  | 26   | 1  | 5  | 16   | 1  | 5  | 2  |

OPTICAL RECORDING MEDIUM

TECHNICAL FIELD

The present invention relates to an optical recording medium, and is preferably applied to optical discs for example.

BACKGROUND ART

Until now, in optical discs, a variety of formats have been proposed as disc formats, one of which is the CAV (Constant Angular Velocity) which adopts a constant disc rotation rate. This CAV format is characterized by the capability of easily controlling the rotation of a disc, however, there are big differences in recording density between an inner circumference and an outer circumference of the disc, which has hampered an increase in the recording capacity of the disc.

In such case, in an optical disc the ZCAV (Zoned CAV) format has been employed as a format which increases recording capacity efficiently by eliminating differences in recording density between the inner and outer circumferences. This ZCAV format allows the inner circumference and the outer circumference of a disc to have the same recording density by changing the number of sectors thereon.

Figure 4:
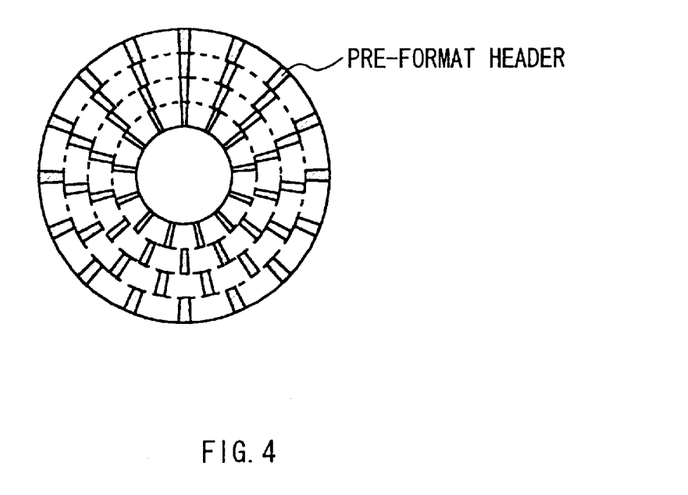
FIG. 4 is a schematic diagram used in explaining a ZCAV format.

Therefore, in the ZCAV format, since each physical track has the different number of sectors, as can be seen in FIG. 4, when a disc is divided into a plurality of zones, pre-format headers are arranged in radial directions in each zone but are not arranged in the same radial directions over the boundary of zones (this is called "zone boundary" hereinafter).

Figure 5:
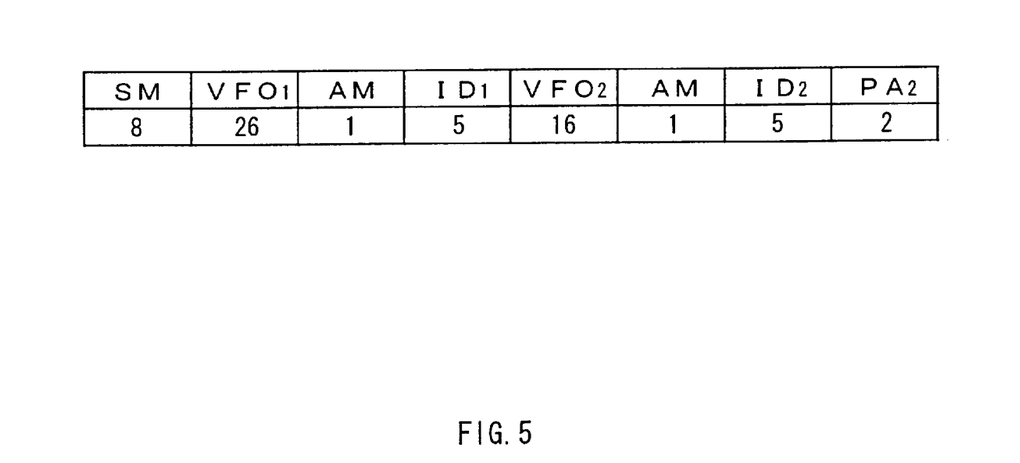
FIG. 5 is a schematic diagram showing an example of a pre-format header.

FIG. 5 shows the format configuration of a pre-format header. As shown in FIG. 5, the pre-format header consists of SM (Sector Mark), which is the beginning of a sector format, VFO storing a clock to perform pull-in operation by PLL (Phase Locked Loop), AM (Address Mark) indicating the starting position of ID (Identification), ID storing a track number and a sector number, etc., and PA (Postamble) storing data for performing (1, 7) encoding.

In an optical disc device, in order to focus the spot of laser light emitted from an optical pickup on a track of the recording surface of the optical disc (that is, to perform tracking servo), a tracking error (TE) signal indicating positional information, which becomes zero (0) when the laser light is just on the track, is detected, however, when the optical pickup passes over a pre-format header, noise occurs in the tracking error signal.

In this optical disc device, tracking servo is realized by performing landing when noise occurs in the tracking error signal. For additional information, typical seek operation is divided into rough seek operation and minute seek operation, and landing is defined as an operation from the time when seek operation shifts to minute seek operation until tracking servo is performed.

In this case, as long as noise occurs in the tracking error signal periodically, the optical disc device can perform tracking servo without fail by performing landing when noise occurs.

Figure 6:
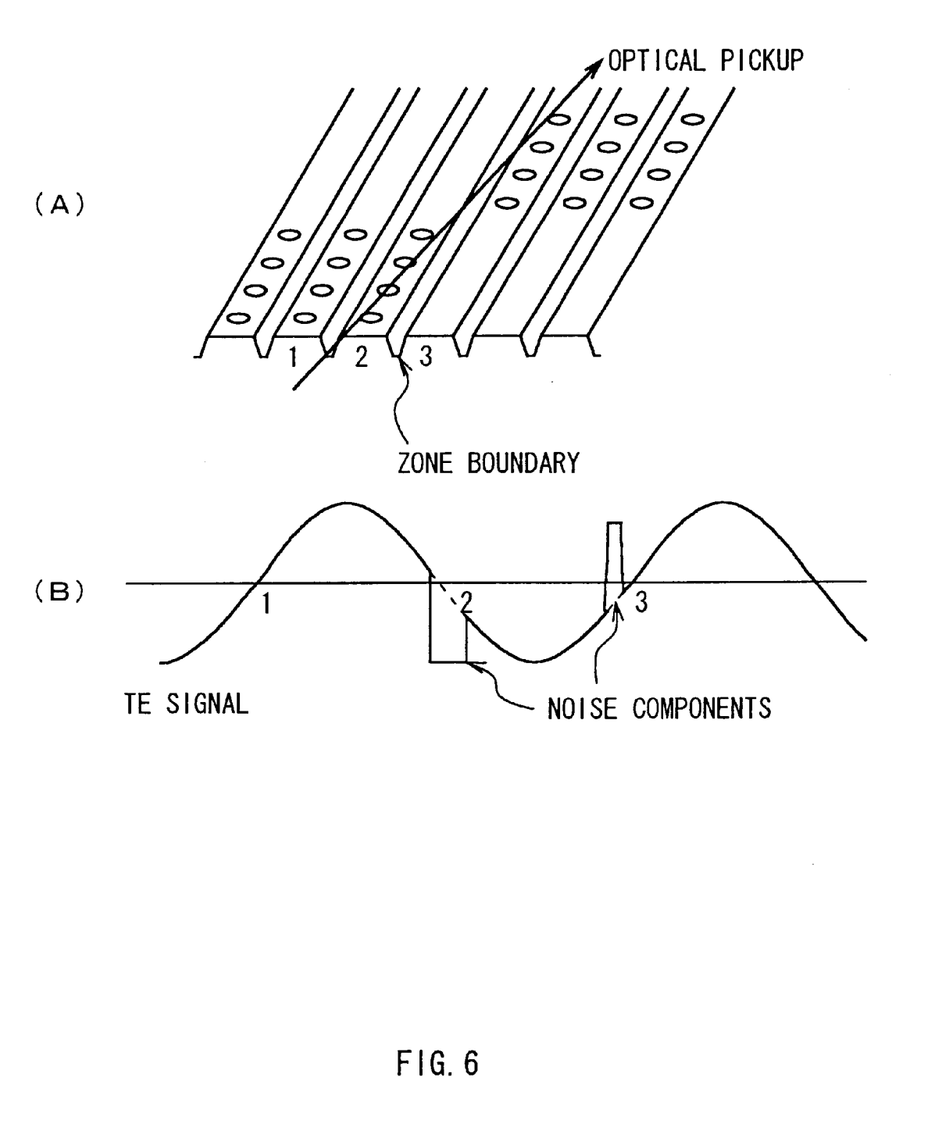
FIG. 6 is a schematic diagram showing a tracking error signal and noise components.

Meantime, in the optical disc device, if the tracking pitch is made narrower to increase the recording density of an optical disc, as shown in FIG. 6, noise, which occurs when the optical pickup passes over pre-format headers (FIG. 6(A)), becomes bigger relative to the amplitude of the tracking error signal (FIG. 6(B)).

As a result, in the optical disc device, when landing is performed traversing the zone boundary, noise generated by pre-format headers arranged in a neighboring zone in the vicinity of the zone boundary occurs in the tracking error signal at a period different from that of noise generated by the pre-format headers arranged in the same zone (FIG. 6(B)), and as a result, the noise may cause tracking servo erroneously.

Figure 7:
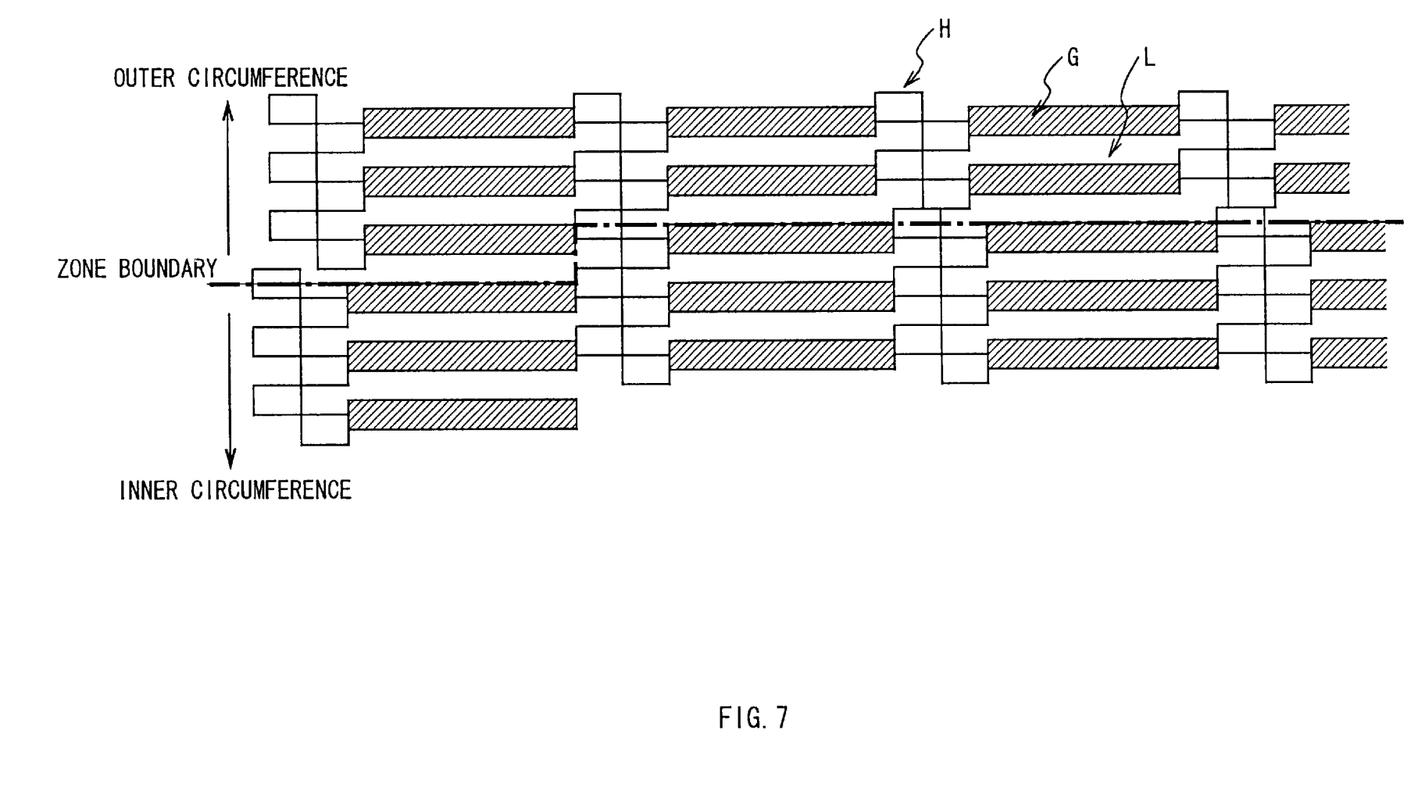
FIG. 7 is a schematic diagram used in explaining a pre-format having a staggered arrangement.

As shown in FIG. 7, in the recent optical disc a land-and-groove recording format in which data is recorded on both lands L and grooves G, has been employed to increase the recording capacity, wherein staggered pre-format headers are shared by the lands L and the grooves G.

Figure 8:
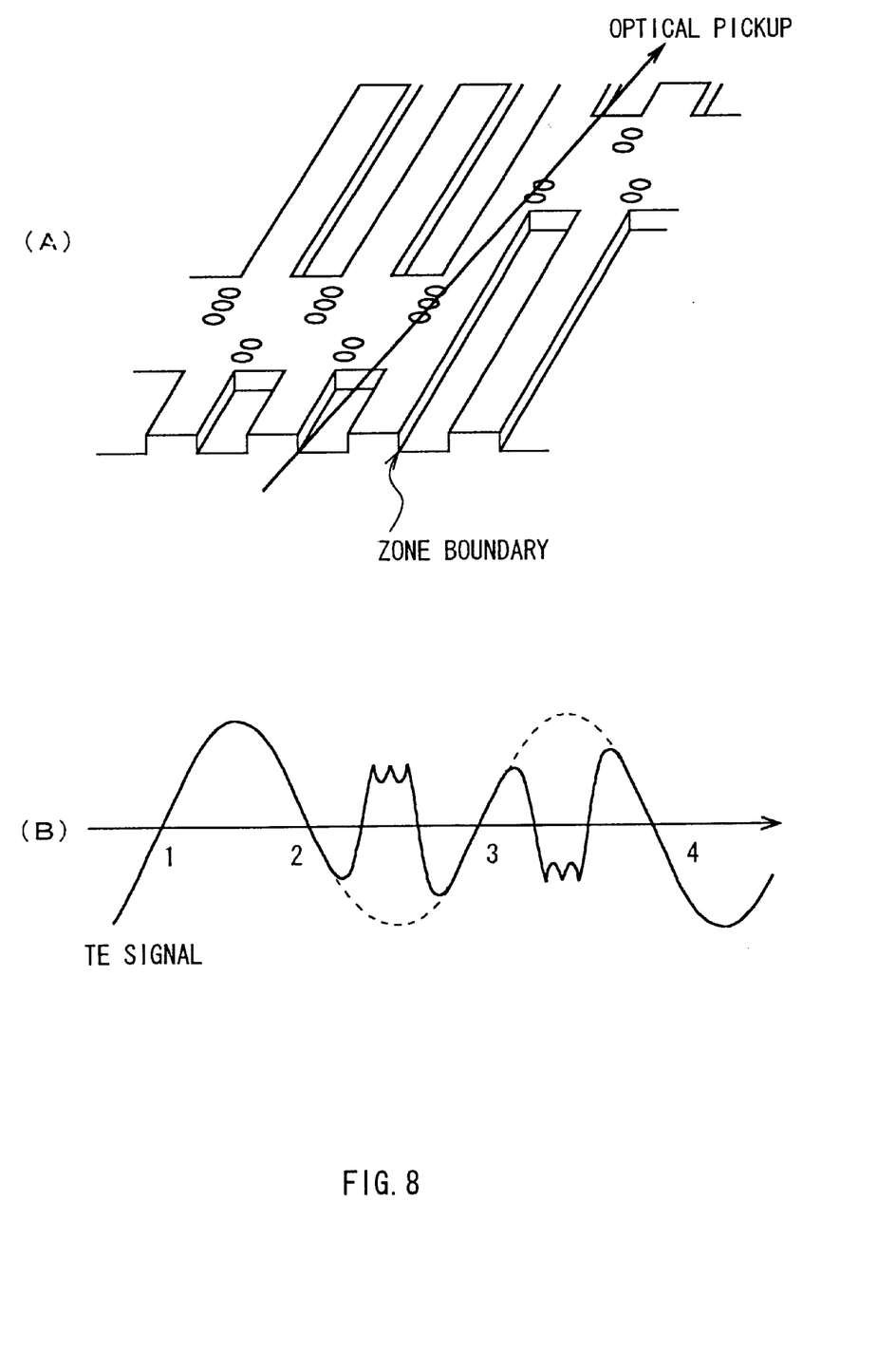
FIG. 8 is a schematic diagram showing a tracking error signal and noise components.

In an optical disc of the land-and-groove recording format having staggered pre-format headers, as shown in FIG. 8, noise which occurs when the optical pickup passes over a pre-format header (FIG. 8(A)) becomes bigger (FIG. 8(B)) compared with the noise shown in FIG. 6(B), which has posed an inevitable problem where tracking servo is more unstable.

Figure 9:
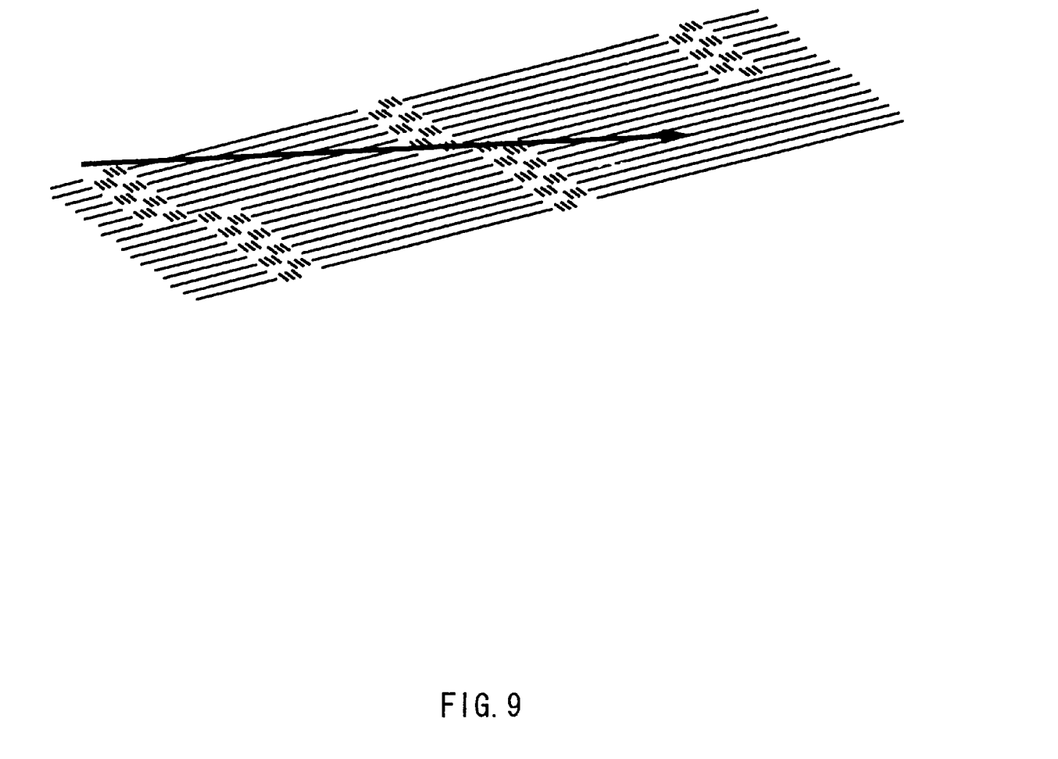
FIG. 9 is a schematic diagram used in explaining a seek operation traversing a zone boundary.
Figure 10:
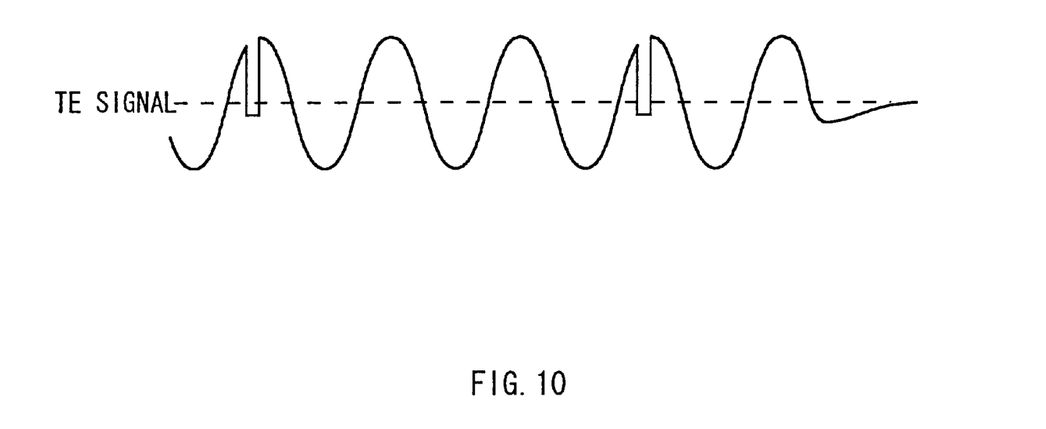
FIG. 10 is a schematic diagram used in explaining successful landing.

This problem is explained hereunder specifically. FIG. 9 shows a seek operation traversing a zone boundary. As shown in FIG. 10, when noise occurs periodically at long periods in a tracking error signal obtained when the seek operation is performed in the same zone, the optical disc device detects the noise generated in the tracking error signal when the value of the moving speed of the optical pickup becomes lower than a given threshold value, so that the detected noise causes landing and tracking servo.

Figure 11:
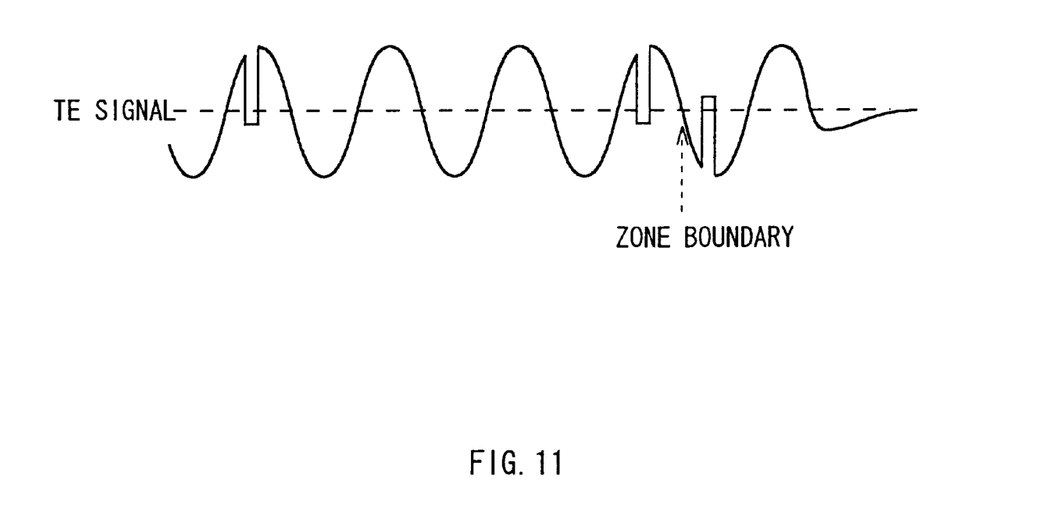
FIG. 11 is a schematic diagram used in explaining unsuccessful landing.

As shown in FIG. 11, however, in a tracking error signal which is obtained while performing the seek operation traversing zones, when noise is generated non-periodically by the pre-format headers arranged in the vicinity of the zone boundary immediately after the occurrence of the noise which causes landing, the optical disc device is to perform the tracking servo erroneously due to non-periodically occurred noise.

Figure 12:
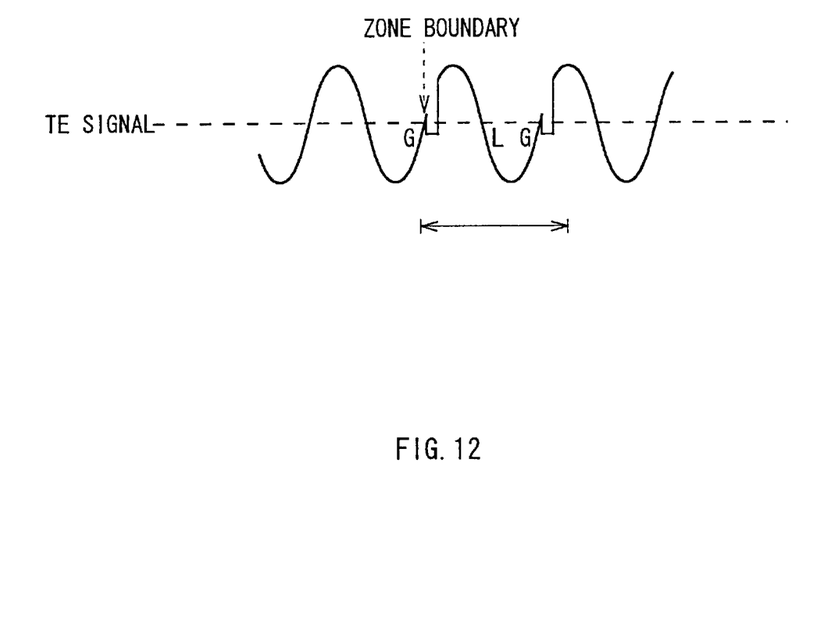
FIG. 12 is a schematic diagram used in explaining unsuccessful landing.
Figure 13:
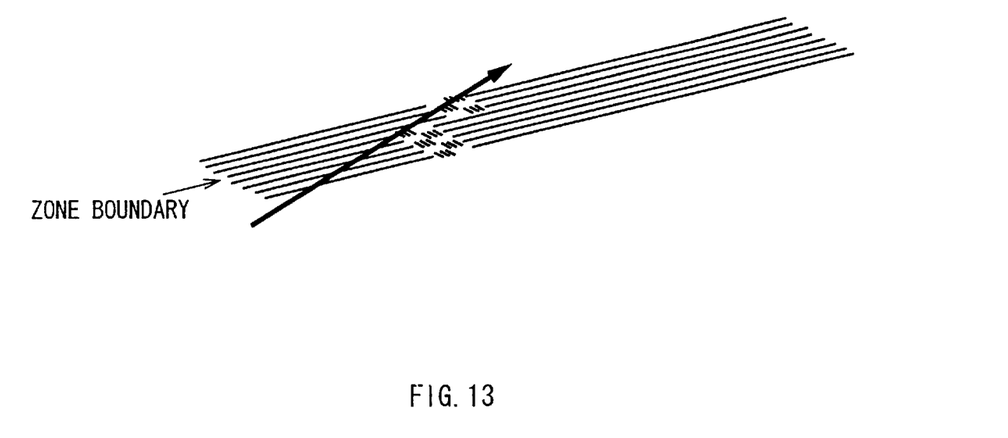
FIG. 13 is a schematic diagram used in explaining the seek operation traversing a zone boundary.

That is, as shown in FIG. 12, in the tracking error signal obtained in performing seek operation shown in FIG. 13, when the optical disc device detects noise which causes landing, the tracking servo is performed when the rising or falling edge comes immediately after the noise, however, if noise occurs about the time between detection of nose and tracking servo, this noise causes tracking servo erroneously.

Figure 14:
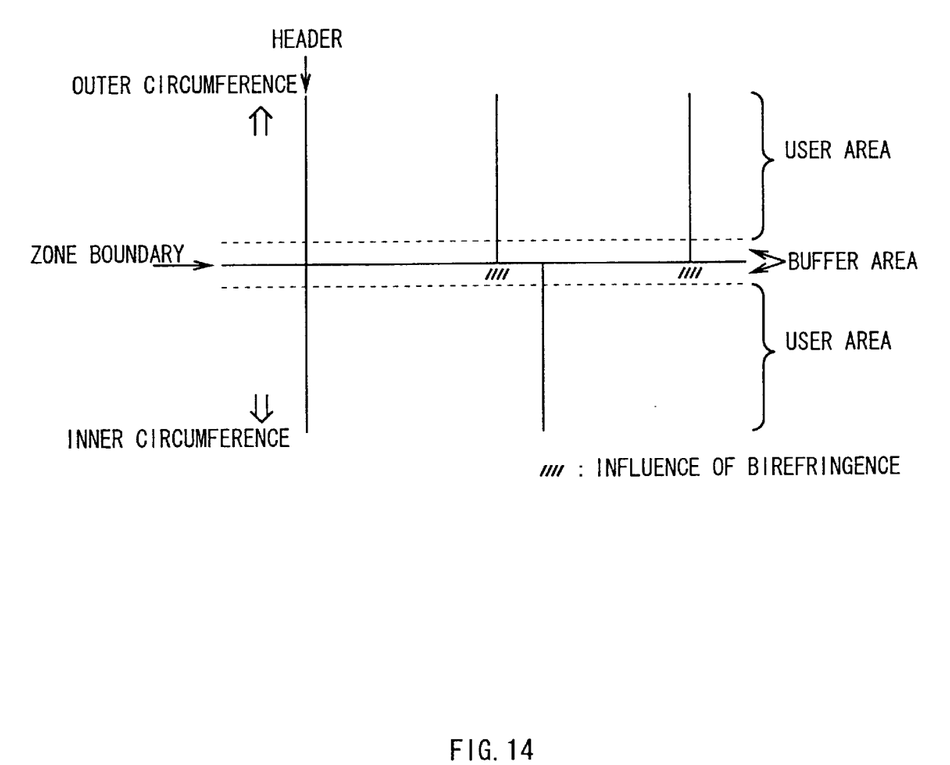
FIG. 14 is a schematic diagram used in explaining the influence of birefringence.

Also, in the optical disc, as shown in FIG. 14, there has been a problem of birefringence (distortion), or of an event in which part of pre-format headers arranged in an arbitrary zone appears in data field of the adjacent zone, resulting in the deterioration of a data error rate along the zone boundary.

As a means for avoiding such a problem of birefringence, a method to prevent the error rate from deteriorating has been employed; a few circles are provided as a buffer area along each zone boundary, and the buffer area is defined as a user-access prohibited area.

This method, however, needs to secure buffer areas including areas which are not influenced by birefringence, which makes it impossible to avoid decrease in the recording capacity.

DESCRIPTION OF THE INVENTION

The present invention has been made considering those points, and is intended to propose an optical recording medium capable of enhancing the stability of landing traversing a zone boundary.

In the present invention, in order to solve such problems, a recording area is divided into a plurality of zones, so that headers are arranged in radial directions in each zone but are not arranged in the same directions over the zone boundary, and the headers are arranged to be shared by the lands and the grooves. And, in an optical recording medium formatted to record data on both the lands and the grooves, headers disposed within three or more physical tracks from each boundary, thereby making it possible to prevent noise from occurring in the tracking signal during the time from the occurrence of noise, which causes landing, in the tracking error signal until the tracking servo is performed.

BEST MODE FOR CARRYING OUT THE INVENTION

Detailed explanation is given hereunder on one mode of the present invention with reference to the drawings attached.

Figure 1:
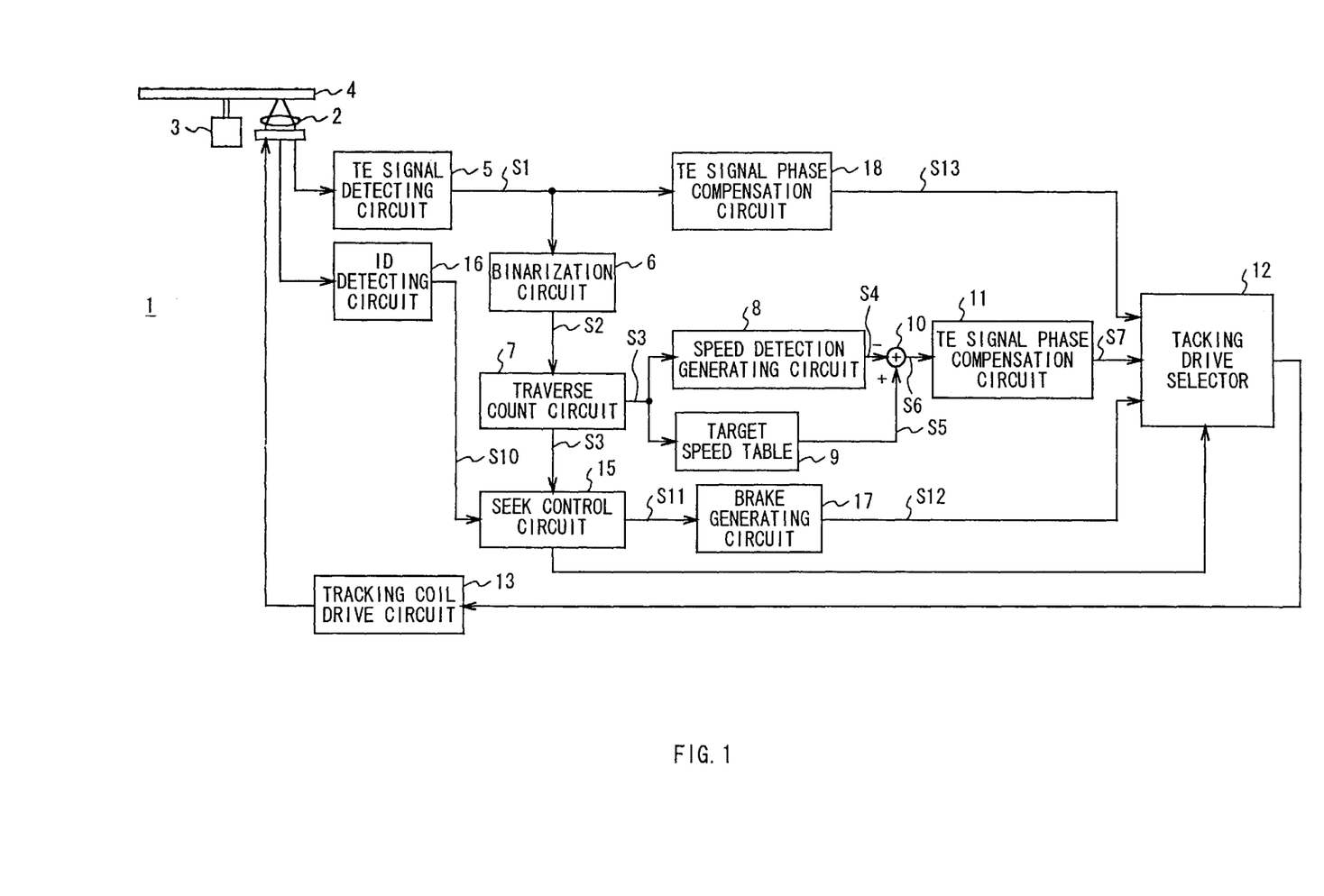
FIG. 1 is a block diagram showing one mode of embodiment of an optical disc drive according to the present invention.

In FIG. 1, reference numeral 1 shows an optical disc drive as a whole, and this comprises the seek and tracking control circuits of an optical disc device. In the optical disc drive 1, an optical disc 4 being rotated by a spindle motor 3 is irradiated with laser light emitted from an optical pickup 2. And, in the optical disc drive 1, the laser light reflected from the optical disc 4 is incident on the optical pickup 2, and an output signal according to the reflected light is inputted into a tracking error (TE) signal detecting circuit 5.

In order to focus the spot of the laser light emitted from the optical pickup 2 on a track on the recording surface of the optical disc 4 (that is, to perform tracking servo), the tracking error signal detecting circuit 5 detects a tracking error signal indicating positional information which becomes zero when the spot is just on the track, and sends the detected tracking error signal S1 to a binarization circuit 6.

The binarization circuit 6 binary-codes the tracking error signal S1 being a waveform in a sine wave shape, and sends the resultant digital data S2 to a traverse count circuit 7. The traverse count circuit 7 counts the number of tracks passed, by counting the rising and falling edges of the digital data S2, and gives the resultant count value S3 to a speed detecting circuit 8 and a targeted speed table 9.

The speed detecting circuit 8 detects the movement speed of the beam spot on the optical disc 4 based on the count value S3, and sends the detected result to an adding circuit 10 as a speed signal S4. The targeted speed table 9 has a table regarding a targeted speed corresponding to the position of the beam spot on the optical disc 4, and by detecting the targeted speed corresponding to the current position of the beam spot based on the count value S3 supplied from the traverse count circuit 7, sends the targeted speed to the adding circuit 10 as a targeted speed signal S5.

The adding circuit 10 calculates an error in the speed of the actual beam spot relative to the targeted speed by subtracting the value of the speed signal S4 from that of the targeted speed signal S5, and sends the calculated value to a tracking error signal phase compensation circuit 11 as a speed error signal S6.

The tracking error signal phase compensation circuit 11 performs phase compensation on the speed error signal S6, and sends the resultant speed error signal S7 to a tracking drive selector 12. During the seek operation to move an object lens of the optical pickup onto the targeted track, the tracking drive selector 12 sends the speed error signal S7 to a tracking coil drive circuit 13. The tracking coil drive circuit 13 is designed to move the beam spot to the targeted track by driving a tracking actuator of the optical pickup 2 based on the speed error signal S7.

Figure 2:
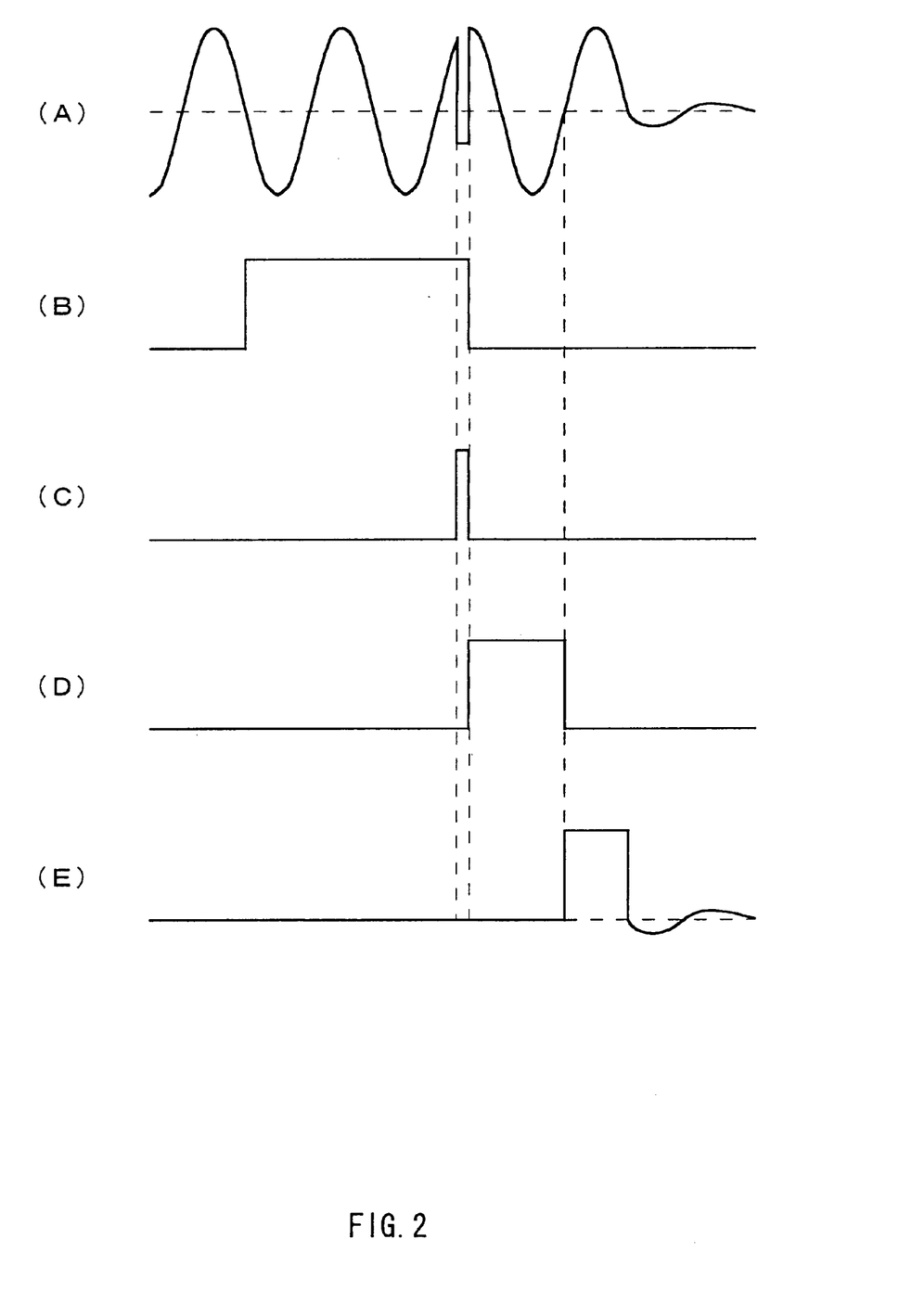
FIG. 2 is a schematic diagram showing a timing chart.

The traverse count circuit 7 sends out to a seek control circuit 15 the count value S3 indicating the number of tracks passed obtained from the tracking error signal S1 (FIG. 2(A)). Upon recognizing the arrival of the beam spot on the targeted track based on the count value S3, the seek control circuit 15 changes itself into a mode to receive an ID detecting signal S10 which is supplied from an ID detecting circuit 16, by generating an ID search signal (FIG. 2(B)).

Based on an output signal supplied from the optical pickup 2, the ID detecting circuit 16 detects noise which is generated when the optical pickup 2 passes over pre-format headers, and sends detected noise to the seek control circuit 15 as an ID detecting signal 10 (FIG. 2(C)).

Upon detecting the ID detecting signal S10, the seek control circuit 15 generates a brake timing detecting signal S11 (FIG. 2(D)), which is then transferred to a brake generating circuit 17. Based on the brake timing detecting signal S11, the brake generating circuit 17 produces brake pulses S12 by detecting the rising zero-cross or the falling zero-cross (in this case, the rising zero-cross) in the tracking error signal S1, and sends the brake pulses S12 to the tracking drive selector 12.

The tracking drive selector 12 selects a brake pulse S12 under the control of a seek control circuit 15, and sends it to the tracking coil drive circuit 13. The tracking coil drive circuit 13 performs landing and tracking servo by driving the tracking actuator of the optical pickup 2 based on the brake pulse S12.

Meanwhile, the tracking error signal detecting circuit 5 sends the detected tracking error signal S1 to a tracking error signal phase compensation circuit 18. The tracking error signal phase compensation circuit 18 performs phase compensation on the tracking error signal S1, and sends the resultant tracking error signal S13 to the tracking drive selector 12.

The tracking drive selector 12 selects a tracking error signal S13 under the control of the seek control circuit 15, and sends it to the tracking coil drive circuit 13. The tracking coil drive circuit 13 makes the beam spot kept positioned on the targeted track by driving the tracking actuator of the optical pickup 2 based on the tracking error signal S13.

In the optical disc 4 the ZCAV (Zoned CAV) format is employed as a disc format to efficiently increase the recording capacity by eliminating differences in recording density between the inner and the outer circumferences. In the ZCAV format, since each physical track has a different number of sectors, a disc is divided into a plurality of zones, when pre-format headers are arranged in radial directions in each zone but are not arranged in radial directions over a boundary.

Figure 3:
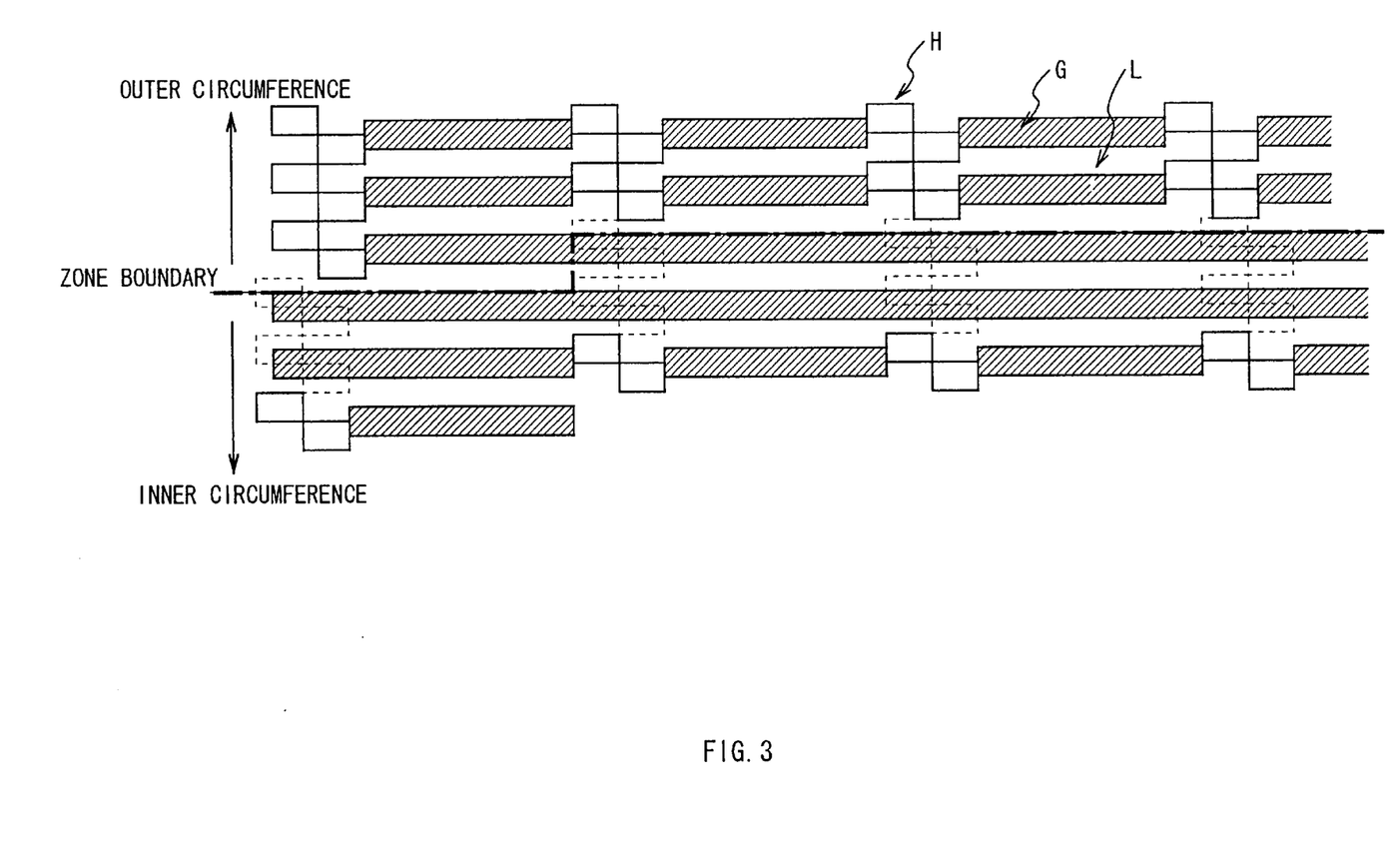
FIG. 3 is a schematic diagram used in explaining a pre-format having a staggered arrangement.

Also, in an optical disc 4, the land-and-groove recording format, as shown in FIG. 3, in which data is recorded on both the lands L and the grooves G, is employed in order to increase the recording capacity, and furthermore, so-called staggered pre-format headers H shared by both the lands L and the grooves G are used in the land-and-groove recording format.

Moreover, referring to FIG. 3, in the optical disc 4, as shown in FIG. 3, a grooving process (that is, a grooving process after clearing the pre-format headers H) is applied to the area of three physical tracks toward the inner circumference from each zone boundary to enhance the stability of landing traversing the zone boundary. One physical track means one circle of a groove or a land.

In the above structure, in the optical disc 4 a grooving process (that is, a grooving process after clearing pre-format headers) is applied to the area of three physical tracks toward the inner circumference from each zone boundary.

Upon detecting noise which causes landing in the tracking error signal S1 obtained in performing the seek operation traversing zones, the optical disc drive 1 performs tracking servo at the timing of the rising or falling edge which comes immediately after the noise.

However, if noise is generated by a pre-format header H located in the vicinity of the boundary of zones during the time from the detection of the noise until performing the tracking servo, this noise causes the optical disc drive 1 to perform the tracking servo erroneously.

Accordingly, in the optical disc 4, grooving is performed on the area corresponding to the time from the occurrence of the noise which causes landing until the tracking servo is performed, that is, on the area of three physical tracks toward the inner circumference from each zone boundary so that it is possible to prevent the generation of noise in the tracking error signal S1 during the time from the occurrence of the noise which causes landing until the tracking servo is performed, resulting in the enhancement of the stability of landing traversing the zone boundary.

Also, the optical disc 4 can avoid the influence of birefringence, without the provision of buffer areas along the zone boundary, by grooving the area of three physical tracks toward the inner circumference from each zone boundary. Therefore, it is possible to prevent data rate about the zone boundary from deteriorating, avoiding a decrease in recording capacity.

According to the above structure, it is possible to prevent the generation of noise in the tracking error signal S1 during the time from the occurrence of the noise which causes landing until the tracking servo is performed by grooving the area of three physical tracks toward the inner circumference from each zone boundary, resulting in the enhancement of the stability of landing traversing a zone boundary.

In the above mode of embodiment, explanation is given on the case where the present invention is applied to an optical disc 4, however, the present invention is not limited to it, and can be applied to a wide variety of optical recording media.

Also, in the above mode of embodiment, explanation is given on the case of grooving on the area of three physical tracks toward the inner circumference from the zone boundary. The present invention, however, is not limited to it, and grooving may be performed on the area of more than three physical tracks from the zone boundary.

Furthermore, in the above mode of embodiment, explanation is given on the case of grooving the area of three physical tracks toward the inner circumference from each zone boundary. The present invention, however, is not limited to it, and grooving may be performed on the area of an even-number, more than three, of physical tracks from each zone boundary.

Since the area of an even-number of physical tracks from each zone boundary is grooved, the same number of physical tracks is accessible about a zone boundary between the lands and grooves. Therefore, software processing in an access control and an optical pickup control can be performed in common between the lands and the grooves, which prevents an increase in the volume of software.

Also, the grooving of the area of an even-number of physical tracks from each zone boundary makes it possible to simplify a variety of software such as stamper-producing software for molding optical discs 4.

According to the present invention described above, in an optical recording medium having a recording format to record data on both the lands and grooves in such a way that a recording area is divided into a plurality of zones and headers are arranged continuously in radial directions in the same zone but are not arranged in the same radial directions over a zone boundary so that the headers can be shared by the lands and the grooves, the headers arranged within the area of three or more physical tracks from a zone boundary are cleared and grooved. Which can prevents noise from occurring in a tracking error signal about the time from the occurrence of the noise, which occurs in a tracking error signal and causes landing, until the tracking servo is performed, thus making it possible to enhance the stability of landing traversing the zone boundary.

Industrial Utilization

This present invention can be applied to an optical recording medium such as an optical disc.

What is claimed is:

1. An optical recording medium of a recording format to record data on both lands and grooves in such a manner that a recording area is divided into a plurality of zones, headers arranged continuously in radial directions in the same zone are not arranged in the same radial directions over a zone boundary and said headers are so arranged as to be shared by the lands and the grooves, wherein the headers arranged within three or more physical tracks from said zone boundary are cleared and grooved.

2. The optical recording medium according to claim 1, wherein the headers arranged within an even number of physical tracks from said zone boundary are cleared and grooved.

* * * * *